(12) United States Patent
May et al.

(10) Patent No.: US 12,291,148 B2
(45) Date of Patent: May 6, 2025

(54) MOUNTING SYSTEM AND METHOD FOR EXTERIOR MIRROR

(71) Applicant: Honda Motor Co., Ltd., Tokyo (JP)

(72) Inventors: Hunter May, Columbus, OH (US); Timothy J. Rupp, Dublin, OH (US); Jesse W. Schlabach, Marysville, OH (US); Douglas R. Kaltenmark, Dublin, OH (US); Babuji K. Tamarapoo, Powell, OH (US); Hirofumi Takemoto, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 9 days.

(21) Appl. No.: 18/299,575

(22) Filed: Apr. 12, 2023

(65) Prior Publication Data

US 2024/0343190 A1 Oct. 17, 2024

(51) Int. Cl.
*B60R 1/06* (2006.01)
*B60J 10/78* (2016.01)
*B60R 16/02* (2006.01)

(52) U.S. Cl.
CPC ............ *B60R 1/06* (2013.01); *B60R 16/0215* (2013.01)

(58) Field of Classification Search
CPC ............. B60J 10/78; B60J 10/72; B60J 10/86
See application file for complete search history.

(56) References Cited

U.S. PATENT DOCUMENTS

| 10,889,172 B2* | 1/2021 | Iwai ......................... B60J 10/86 |
| 2022/0281392 A1 | 9/2022 | Noack et al. |
| 2023/0382200 A1* | 11/2023 | Cho .......................... B60R 1/06 |

FOREIGN PATENT DOCUMENTS

| CN | 214396682 U | 10/2021 |
| CN | 217705649 U | 11/2022 |
| JP | 2008001116 A | 1/2008 |
| JP | 2013063681 A | 4/2013 |
| JP | 2014058192 A | 4/2014 |
| JP | 5853545 B2 | 2/2016 |
| KR | 10-2005-0102509 A | 10/2005 |
| WO | 2017153649 A1 | 9/2017 |

* cited by examiner

*Primary Examiner* — Nkeisha Smith
(74) *Attorney, Agent, or Firm* — Plumsea Law Group, LLC

(57) ABSTRACT

A mounting system and method for a mirror assembly of a vehicle is provided. The mirror assembly includes a plate mounting portion formed along the body plate of the mirror assembly that includes provisions for secure attachment to a door sash of a vehicle. The mirror assembly also includes a base mounting portion formed along an underside of the swivel arm of the mirror assembly that includes provisions for secure attachment to a door skin of the vehicle.

20 Claims, 5 Drawing Sheets

MOUNTING SYSTEM AND METHOD FOR EXTERIOR MIRROR

BACKGROUND

The present disclosure generally relates mounting systems and methods for a side-view mirror provided at a side of, for example, a vehicle, and more particularly relates to the technical field of mounting systems which stabilize the fixed connection to the mirror, improve water management, and reduce wind noise.

Generally, a vehicle body is provided with various moving parts, for example, a trunk lid and a tailgate, as well as front and rear doors. The moving parts are mounted or otherwise secured within fixed mounting parts of the vehicle body in such a way as to be openable and closeable. Mirror assemblies for a vehicle side door generally includes a housing, which has a glass assembly mounted thereto, supported on a support arm affixed to the vehicle side door. Typically, the housing is configured to rotate around an inner base member of the support arm in a way that allows the housing to fold forward or rearward, which is useful during an impact or preventing damage when parked.

At the intersection between the two vehicle parts, gaps are inevitably formed between the moving parts and the fixed parts of the vehicle body. Such gaps are generally referred to as seal gaps. The seal gaps provide the necessary clearance to prevent interference between the moving part and the mounting part. However, while a vehicle is operating, air, water, or other fluids may enter through the seal gaps into the vehicle, and contribute to wind noise concerns. For example, such intrusive elements can damage the components, as well as contribute to undesirable noise and vibrations during operation of the vehicle, particularly at high speeds.

There is a need in the art for a mounting structure that improves the interface and attachment between the side mirror and vehicle body, and addresses the shortcomings described above.

SUMMARY

The disclosed embodiments provide methods and systems for improving the attachment of mirror assemblies to vehicles, and specifically to increase structural rigidity of the mounted mirror assembly, as well as reduce undesirable noise and/or vibration that can be otherwise generated. The embodiments further improve the seal between the mirror assembly and vehicle, thereby reducing the ingress of contaminants such as dirt and water.

In one aspect, a mounting system for a vehicle door mirror assembly is disclosed. The mirror assembly includes a swivel arm and a plate body. In addition, a plate mounting portion is provided along a proximal side of the plate body. The plate mounting portion includes a plurality of mounting tabs and a fastener, and the plate mounting portion is configured for secure attachment to a door sash of a vehicle side door. Furthermore, a base mounting portion is provided along an underside of a portion of the swivel arm, and a portion of the plate body. The base mounting portion is oblique relative to the plate mounting portion, and the base mounting portion is configured for secure attachment to a door skin of the vehicle side door.

In yet another aspect, a method for mounting a door mirror assembly on a vehicle is disclosed. The method includes a step of mounting a plate mounting portion of the door mirror assembly onto a first portion of a door sash of the vehicle. The method also includes a step of mounting a base mounting portion of the door mirror assembly onto a second portion of a door skin of the vehicle.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
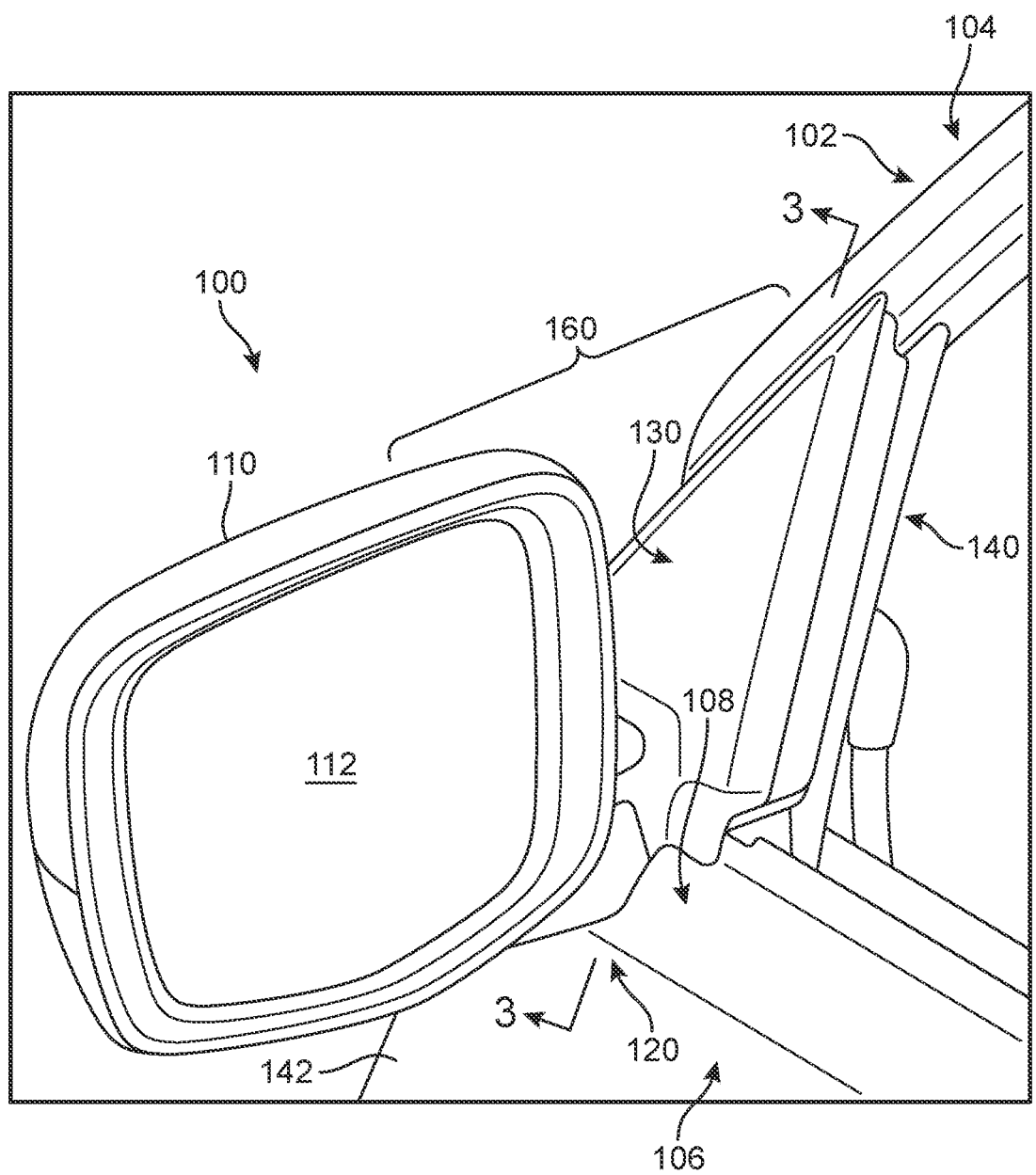
FIG. 1 presents a perspective schematic view of one example of a mirror assembly mounted on a vehicle, according to an embodiment.

Referring to FIG. 1, an example of a vehicle 102 provided with a door mirror mounting structure and side-view mirror assembly ("assembly") 100, according to an embodiment. In the drawings, a front pillar provided continuously to a vehicle roof is denoted by a reference numeral 104, a side door is denoted by 106, and a door skin is denoted by 108. In one example, a portion of the door skin 108 can form a part of a periphery of a side door window opening.

In different embodiments, the assembly 100 includes a mirror housing 110 holding a mirror 112, a swivel arm 120, and a plate body 130, where the mirror housing 110 is joined to the plate body 130 via the swivel arm 120. As a general matter, the side-view mirror (or side mirror), also known as a wing mirror, is a mirror placed on the exterior of motor vehicles for the purposes of helping the driver see areas behind and to the sides of the vehicle, outside the driver's peripheral vision (in the "blind spot"). The mirror housing 110 is rotatable with respect to the plate body 130 by way of the swivel arm 120.

Furthermore, the side door 106 can be understood to include a door body 142 and a door sash 140. The door body 142 includes an outer panel which forms a side surface of the vehicle body and an inner panel attached to a vehicle inner side of the outer panel. The door sash 140 is provided integrally with an upper part of the door body 142 so as to form an outer frame of the door body 142. In some embodiments, the door sash 140 holds an outer periphery of a door window glass (not shown) supported by the door body 142 so as to be movable upward and downward.

In addition, in different embodiments, the door sash 140 includes an upper portion (not shown) and a front portion. The upper portion is disposed along the inclination of the front pillar 104. A forward end of the upper portion can be bent at an angle, or in a curve, to connect to the front portion. A lower end of the front portion can be connected into the door body 142.

For purposes of convenience, the description makes reference to a set of axes. As a general matter, the term "longitudinal axis" as used throughout this detailed description and in the claims refers to an axis that extends in a longitudinal direction, which is a direction extending the length of a component, such as the length of the wire harness between a first end in the mirror housing and a second end that will be connected to the vehicle. In addition, the term "vertical axis" as used throughout this detailed description and in the claims refers to an axis that extends in a vertical direction, for example in FIG. 1 is a direction running from the top of the mirror housing to the bottom of the mirror housing. Similarly, the term "lateral axis" as used throughout this detailed description and in the claims refers to an axis that extends in a lateral direction, which is a direction running a width of each component. Each axis of the three axes may be understood to be orthogonal relative to the other two axes.

Furthermore, the description makes reference to distal and proximal directions (or portions). As used herein, the distal direction is a direction outward or oriented away from what would be a center of the vehicle to which the assembly is connected. Also, the proximal direction is a direction oriented toward a center of the vehicle to which the mirror housing is connected. Thus, a distal side or region refers to a portion of a component that is disposed further from the vehicle center and a proximal side or region refers to a portion of a component that is disposed nearer to the vehicle center. In this case, the mirror housing is the most distal part of the mirror assembly 100 that can be observed, and the plate body 130 would be the most proximal part of the mirror assembly 100 that can be observed.

Figure 2A:
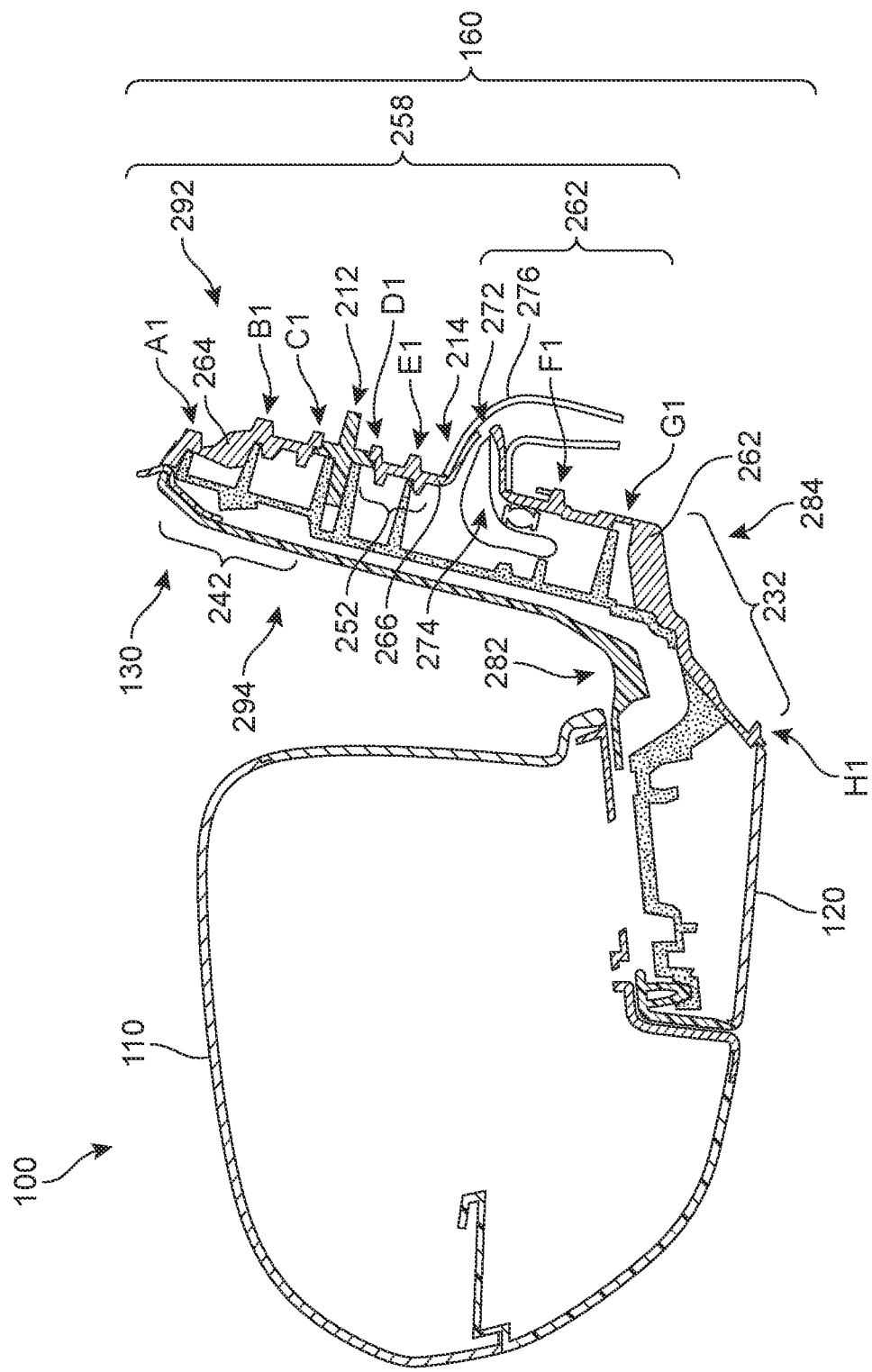
FIGS. 2A and 2B are a cross-sectional exploded view of a mirror assembly and a side door incorporating the mounting system provided herein, according to an embodiment.
Figure 2B:
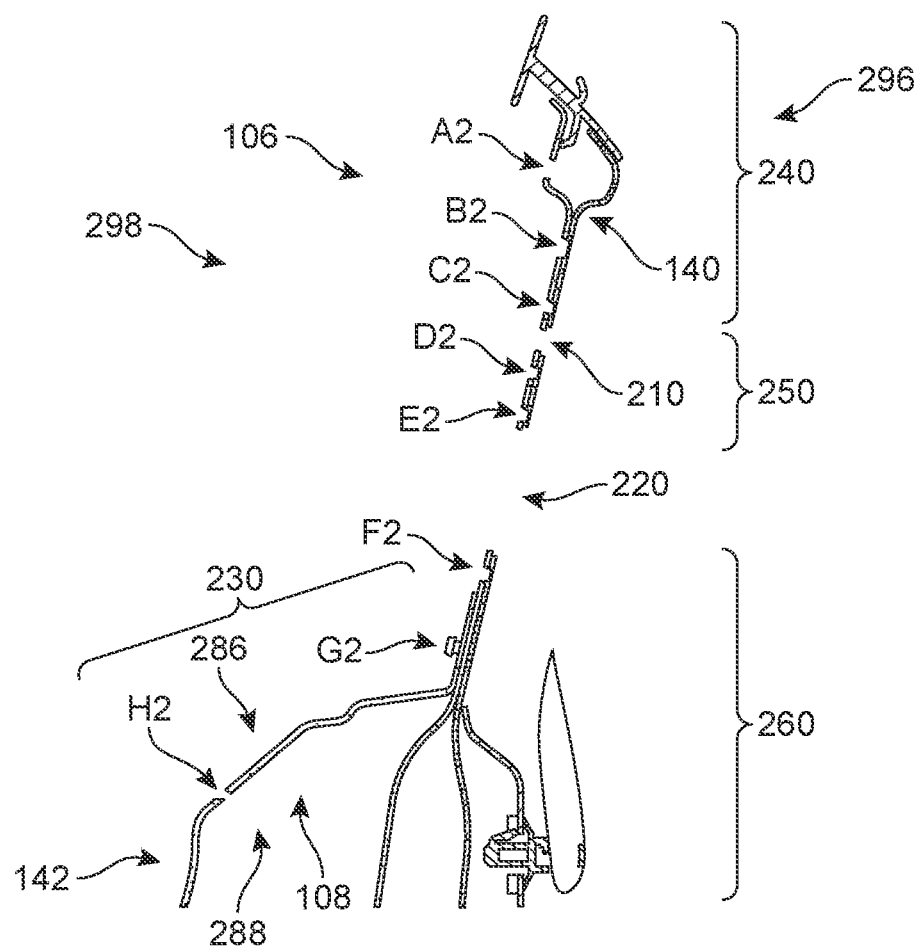

As shown in FIG. 1, in different embodiments, a door mirror mounting unit ("mounting unit") 160 is attached to or fixed along an area of the vehicle 102 defined along a lower section of the door sash 140 and a forward region of the door skin 108. Once mounted, the mounting unit 160 supports and holds components of the mirror assembly 100 securely against the side of the vehicle 102. This relationship can be better observed in the cross-sections taken along line A-A, and represented schematically in FIGS. 2, 3, and 4. FIGS. 2A and 2B present an exploded cross-sectional view of the mirror assembly 100 and the vehicle 102. As shown in FIGS. 2A and 2B, in some embodiments, the mounting unit 160 comprises portions of underside (proximal) regions of the plate body 130 and the swivel arm 120.

More specifically, for purposes of reference and as reflected in this cross-sectional view, the plate body 130 includes a plate proximal side 292 and a plate distal side 294. In addition, the swivel arm 120 includes an arm upper side 282 and an arm lower side 284, where the arm lower side 284 extends past the swivel arm 120 and underneath the plate body 130. Furthermore, with respect to vehicle 102, the side door 106 can be seen to include a door proximal side 296 and a door distal side 298, while the door skin 108 includes a skin upper side 286 and a skin lower side 288. In addition, the side door 106 in this cross-sectional view can be understood to include a first portion 240, a second portion 250, and a third portion 260, each associated with the door sash 140 area.

As shown in FIGS. 2A and 2B, the mounting unit 160 comprises portions of the mirror assembly 100 includes portions along the plate proximal side 292 and the arm lower side 284. In different embodiments, the plate proximal side 292 includes provisions for secure attachment (mounting) into the door distal side 298 of side door 106, provisions which will be referred to collectively as a plate mounting portion ("plate mount") 258. In addition, the arm lower side 284 includes provisions for attachment onto the skin upper side 286 of the door skin 108, collectively referred to as a base mounting portion ("base mount") 232. Some examples of these provisions are described below.

In some embodiments, the plate body 130 can include one or more fasteners, such as a fastener 212. In FIGS. 2A and 2B, the fastener 212 can be seen protruding outward from the proximal side of the plate body 130. In some embodiments, the fastener 212 is sized and dimensioned to fit snugly into a receiving cavity 210 (through-hole, or fixing hole) formed in the side door 106, extending through the door sash 140. In this case, the receiving cavity 210 forms a space between the first portion 240 and the second portion 250 of the side door 106. In one non-limiting example, the receiving cavity 210 receives the fastener 212, such as a screw or bolt, via threading or other connection means to allow for mounting of the mirror assembly 100 along the door sash 140.

In different embodiments, the side door 106 includes an opening 220 (passageway or cutout) for receiving a tube 276 through which a wire harness 274 is routed. In this case, the opening 220 spaces apart the second portion 250 from the third portion 260 of the side door 106. Electronics or electrical features (e.g., heating elements, side mirror power adjustment motors, electrical connectors, mirror switches with directional controls, fused power mirror circuits, etc.) of the side mirror that are dependent on the transfer of power and/or control signals from a location remote relative to the assembly 100 can receive power via the wire harness 274. The wire harness 274 is thereby routed from the various elements in or around the mirror housing 110, and passes through the swivel arm 120 and the thickness of the plate body 130. The wire harness 274, protected and encased by a tube 276, can then be guided toward the vehicle side through the opposite side of the plate body 130 via a gasket 272 that protrudes from the plate body 130. The wire harness 274 may then continue outward for connection with the vehicle's electrical connector (e.g., via male-to-female or other connector arrangement) for access to a power supply.

In different embodiments, the plate body 130 includes additional elements by which to mount the assembly 100 onto the door sash 140. For example, a plurality of mounting tab connectors (also referred to herein as "mounting tabs"), denoted in FIG. 2A as A1, B1, C1, D1, E1, F1, and G1 can be see extending from the plate proximal side 292. Each of these mounting tab connectors can be received in a correspondingly shaped recessed portion/slot (denoted in FIG. 2B as A2, B2, C2, D2, E2, F2) where the same letter pair (e.g., "A1" and "A2") refer to a coupling mechanism) formed in the door sash 140 and allow engagement between the door sash 140 and each tab, shown in FIG. 2B. More specifically, in some embodiments, a first set of mounting tabs including A1, B1, and C1 are formed along a first region 242 of the mounting unit 160, a second set of mounting tabs including D1 and E1 are formed along a second region 252 of the mounting unit 160, and a third set of mounting tabs including F1 is formed along a third region 262 of the mounting unit 160.

In different embodiments, the first set of mounting tabs, in first region 242, are arranged to mate with the recesses A2, B2, and C2 in the first portion 240 along the door sash 140, the second set of mounting tabs, in second region 252, are arranged to mate with the recesses D2 and E2 in the second portion 250 along the door sash 140, and the third set of mounting tabs, in third region 262, are arranged to mate with the recess F2 in the third portion 260 along the door sash 140. In addition, in some embodiments, one or more mounting tabs may also be provided alongside a surface of the door sash 140 (e.g., see "G2" in FIG. 2B). Such tabs can be received in a correspondingly shaped recessed portion or slot formed along the plate proximal side 292 (e.g., see "G1" in FIG. 2A). Thus, as the mirror assembly 100 is positioned against the door sash 140, the two sides can be fixedly mated by connection between fastener 212 and receiving cavity 210, as well as the engagement of each of the mating tab connectors within their corresponding recess, allowing for a secure mount.

As discussed herein, the proposed embodiments offer a mounting structure that improves water management, decreases wind noise, and reduces vibration of the mirror assembly relative to the vehicle. Beyond the additional structural rigidity provided by the mounting structure associated with the door sash area described above, in different embodiments, the system can further include a substantial increase in overall mirror assembly stability and performance by the disposition of the base mounting portion ("base mount") 232 of the mounting unit 160 atop a fourth portion 230 of the side door 106. In this case, the fourth portion 230 corresponds to an area of the door skin 108. Thus, the base mount 232 is sized, dimensioned, and shaped to fit flush against the skin upper side 286 of the fourth portion 230 of the door skin 108. In other words, the exterior surface of the underside (arm lower side 282) has a substantially similar curvature as the exterior surface of the fourth portion 230, allowing for the two surface areas to be mutually aligned or adjoined at their interface, similar to two matching puzzle pieces, and provides a seamless transition from the mirror assembly 100 to the door. In addition, the flush arrangement allows for an even distribution of weight from the base mounting portion onto the door skin.

In some embodiments, an additional mounting tab portion H1 is also provided along the base mount 232 at the most distal end of the arm lower side 282 to help anchor the base mount 232 against the door skin 108. In one example, tab H1 can be received in a correspondingly shaped recessed portion in the door skin 108, denoted H2.

As shown in FIGS. 2A and 2B, it can be appreciated that the fourth portion 230 extends distally and obliquely outward relative to the door sash 140, which instead extends primarily in a downward direction along the surface of the side door 106. Thus, the fourth portion 230 presents a sloped semi-horizontal surface which can be used to 'rest', uphold, or otherwise support a component that is placed on top of its surface. Furthermore, the fourth portion 230 can have a substantially unbroken exterior surface that can serve as a rack or brace upon which the mirror assembly 100 can be sustained, and improve the overall stability of the system. In addition, the use of the door skin 108 as a weight-bearing surface for the base mount 232 of the mounting unit 160 significantly increases the structural rigidity of the assembly, which reduces vibration throughout the system. The door skin 108 further offers a substantially improved sealing area for water management, due to the base mount 232 being allowed to seal onto a single surface, rather than a complicated multi-piece surface. Furthermore, the proposed system enables the placement of the mirror assembly 100 to fall below the B-line molding, which greatly improves wind noise as a result of improved air flow around the mirror assembly 100.

In some embodiments, the base mount 232 can include a sealing member 262, such as foam, a flexible resin material, or another flexible material that offers excellent sealing properties and can adhere tightly to the door skin. A closed cell structure, such as EPT foam, can provide excellent water and air tightness, even under severe conditions, with low compression load. However, in other embodiments, different sealing materials may be alternatively used or mixed in with the EPT foam, including but not limited to other elastomers, rubbers, or long-chain polymers which are capable of cross-linking (vulcanization), including EPDM, TPE, NBR, HNBR, FKM, CR, VMQ, FVMQ, ACM, AEM, SBR, AU/EU, and NR. The sealing member, pressed against the single surface provided by the fourth portion 230, can further stabilize and seal the seam between the mirror assembly 100 and the side door 106, and decrease the likelihood of wind-related noise being generated through an opening. In different embodiments, seal members described herein can be formed entirely or in part of a soft flexible material, for example a single unitary rubber material such as EPT. In some embodiments, an underside of the sealing member 262 is flush against the fourth portion 230, creating an enclosed cell. With this arrangement, the sealing member 262 can limit deflection of the mirror assembly 100 during movements of the vehicle. In addition, sealing member 262 can help protect the internal components of the mirror assembly 100 from water and contamination, and limit water or dirt intrusion into the system.

It should be appreciated that in different embodiments, the sealing materials described herein can also be incorporated into other portions of the mounting unit 160 to promote a stable and watertight attachment. For example, first region 242 can include a first sealing member 264 (shown around mounting tabs A1, B1, and C1 in FIG. 2A), and second region 252 can include a second sealing member 266 (shown around mounting tabs D1 and E1 in FIG. 2A). In addition, sealing member 262 can extend upward into plate body 130, for example around mounting tabs G1 and F1.

Figure 3:
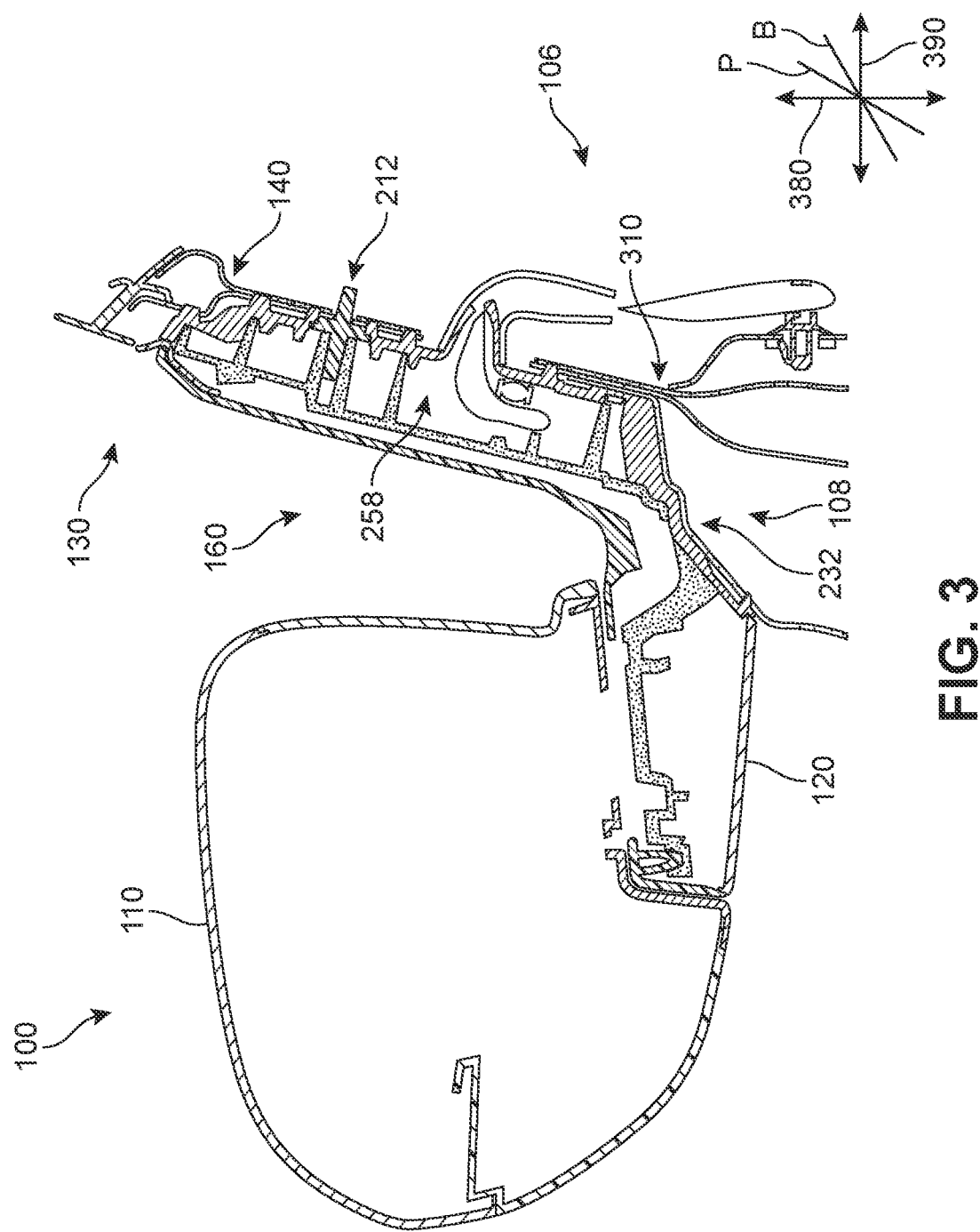
FIG. 3 is a cross-sectional assembled view of the mirror assembly and the side door of FIGS. 2A and 2B, according to an embodiment.
Figure 4:
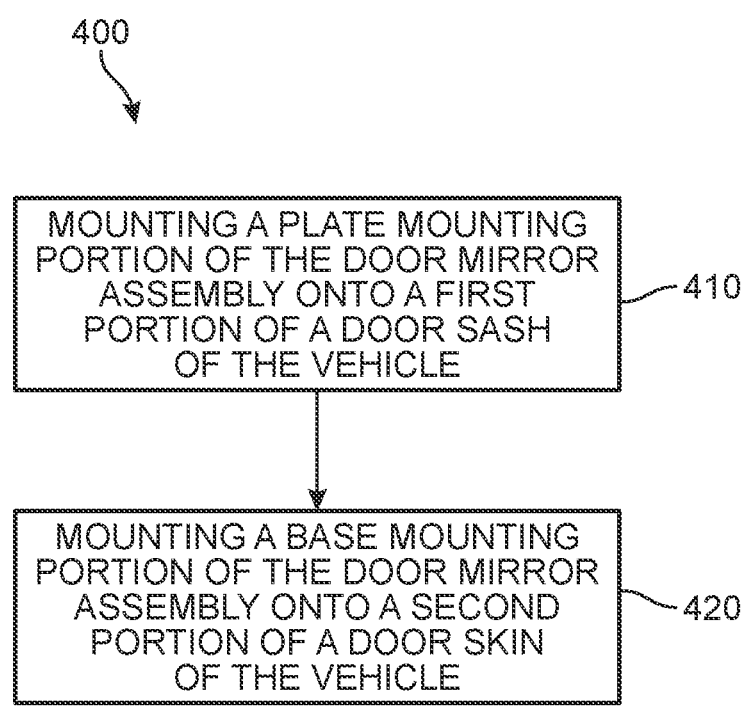
FIG. 4 is a flow chart depicting a method of mounting a door mirror assembly on a vehicle, according to an embodiment.

For purposes of clarity, an assembled or connected view of the mirror assembly 100 along the side door 106 is depicted in FIG. 3. As shown in FIGS. 3 and 4, the plate mount 258 of the mounting unit 160 has been installed against the door sash 140, and secured via the engagement of fastener 212 and the plurality of mounting tabs into their corresponding recesses. Furthermore, the weight of the mirror assembly 100 is primarily exerted along the underside of a portion of the swivel arm 120 and plate body 130 (i.e., the base mount 232), and is distributed and supported by the door skin 108, below a B-Line molding 310 of the vehicle. A seal is provided between the base mount 232 and the door skin 108, which confers additional structural rigidity to the system, reducing vibration conventionally experienced by the door mirror glass. Furthermore, the door skin surface provides a continuous, substantially smooth surface that greatly enhances the sealing quality and strength of the attachment, thereby improving water/fluid management. In addition, by positioning the door mirror below the B-Line molding, there is improved air flow around the mirror assembly, which is associated with a highly desirable reduction in wind noise.

FIG. 3 also illustrates the relative orientations of each of the mounting structures in the mounting unit 160. For example, it can be observed that the orientation of the plate mount 258 is more closely aligned with a vertical axis 380 than the base mount 232. In addition, the base mount 232 is more closely aligned with a horizontal axis 390 than the plate mount 258. In other words, the plate mount 258 slopes down more steeply than the base mount 232. The base mount 232 is thus able to receive a greater distribution of the weight of the mirror assembly 100, as it will rest more heavily on the more horizontal surface provided by the door skin 108.

FIG. 4 is a flow chart illustrating an embodiment of a method 400 of mounting a door mirror assembly on a vehicle. The method 400 includes an operation 410 of mounting a plate mounting portion of the door mirror assembly onto a first portion of a door sash of the vehicle, and an operation 420 of mounting a base mounting portion of the door mirror assembly onto a second portion of a door skin of the vehicle. In different embodiments, the method 400 may include additional processes or aspects. In one example, the method can also include inserting a first mounting tab of the plate mounting portion into a corresponding recess provided in the door sash. In another example, the method 400 includes securing a fastener protruding from the plate mounting portion into a corresponding hole formed in the door sash. In some embodiments, the method can include inserting a first mounting tab of the base mounting portion into a corresponding recess provided in the door skin. In one example, the method may further include routing a wire harness extending from the plate mounting portion into an opening formed in the door sash. In one embodiment, the method includes sealingly engaging the base mounting portion with the door skin to form a watertight seal between the base mounting portion and the door skin. In some embodiments, the base mounting portion is formed along an underside of a portion of the swivel arm of the mirror assembly, as well as an underside of the plate body. In one example, the plate mounting portion is formed along a proximal side of a plate body of the mirror assembly. In some embodiments, the method can also include positioning the mirror assembly against a side door of the vehicle such greater weight of the mirror assembly is exerted on the door skin rather than the door sash. In another example, the plate mounting portion is more closely aligned with a vertical axis than the base mounting portion.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. A vehicle door mirror assembly mounting system, the mirror assembly mounting system including:
    a swivel arm;
    a plate body;
    a plate mounting portion provided along a proximal side of the plate body, including a plurality of mounting tabs and a fastener, wherein the plate mounting portion is configured for attachment to a door sash of a vehicle side door; and
    a base mounting portion provided along an underside of a portion of the swivel arm and a portion of the plate body, the base mounting portion being oblique relative to the plate mounting portion, wherein the base mounting portion is configured for attachment to a door skin of the vehicle side door, and a majority of a weight of the mirror assembly against the vehicle side door is exerted via the base mounting portion.

2. The mounting system of claim 1, wherein the base mounting portion is more closely aligned with a horizontal axis than the plate mounting portion.

3. The mounting system of claim 1, wherein the base mounting portion further includes a sealing member comprising one or more of EPT foam and elastomers to decrease the likelihood of wind-related noise when the base mounting portion is attached to the door skin.

4. The mounting system of claim 1, wherein the mirror assembly also includes a mirror housing and a mirror.

5. The mounting system of claim 1, wherein the mirror assembly also includes a wire harness, and the wire harness extends from the plate mounting portion and is routed into and through an opening formed in the door sash.

6. The mounting system of claim 5, wherein the fastener is disposed above the wire harness.

7. The mounting system of claim 1, wherein the base mounting portion forms a watertight seal with the door skin.

8. The mounting system of claim 7, wherein the base mounting portion is attached to a substantially continuous region of the door skin.

9. The mounting system of claim 1, wherein an exterior curvature of the base mounting portion is flush with an exterior curvature of the door skin.

10. The mounting system of claim 1, wherein the base mounting portion further includes a mounting tab that is configured to engage with a recess formed in the door skin.

11. The mounting system of claim 1, wherein the mirror assembly is positioned below a B-line molding of the vehicle when the mirror assembly is mounted onto the side door.

12. The mounting system of claim 1, wherein the door sash includes a plurality of recesses arranged to receive the plurality of mounting tabs.

13. A method of mounting a door mirror assembly on a vehicle, the method comprising:
    mounting a plate mounting portion of the door mirror assembly onto a first portion of a door sash of the vehicle;
    mounting a base mounting portion of the door mirror assembly onto a first portion of a door skin of the vehicle; and
    routing a wire harness extending from the plate mounting portion into an opening formed in the door sash.

14. The method of claim 13, further comprising inserting a first mounting tab of the base mounting portion into a corresponding recess provided in the door skin.

15. The method of claim 13, wherein the door mirror assembly is positioned below a B-line molding of the vehicle when the door mirror assembly is mounted onto a side door.

16. The method of claim 13, further comprising sealingly engaging the base mounting portion with the door skin to form a watertight seal between the base mounting portion and the door skin.

17. The method of claim 13, wherein the base mounting portion is formed along an underside of a swivel arm of the mirror assembly.

18. The method of claim 13, wherein the plate mounting portion is formed along a proximal side of a plate body of the mirror assembly.

19. The method of claim 13, further comprising positioning the mirror assembly against a side door of the vehicle such that a greater weight of the mirror assembly is exerted on the door skin rather than the door sash.

20. The method of claim 13, wherein the plate mounting portion is more closely aligned with a vertical axis than the base mounting portion.

* * * * *